H. K. WHEELOCK.
TIRE.
APPLICATION FILED FEB. 13, 1917.
1,336,452.
Patented Apr. 13, 1920.
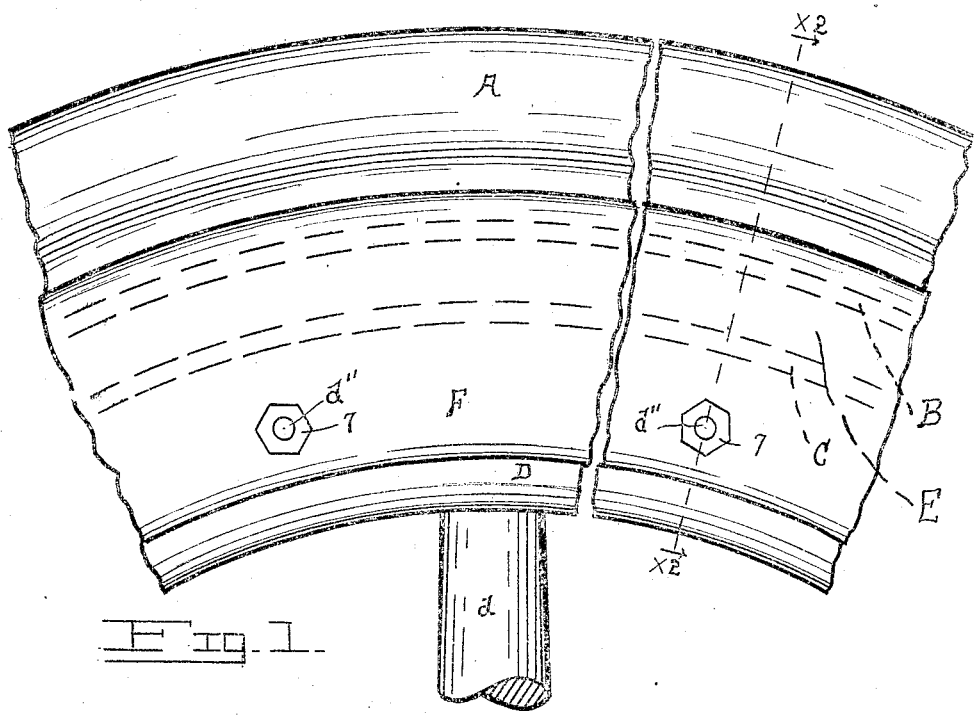
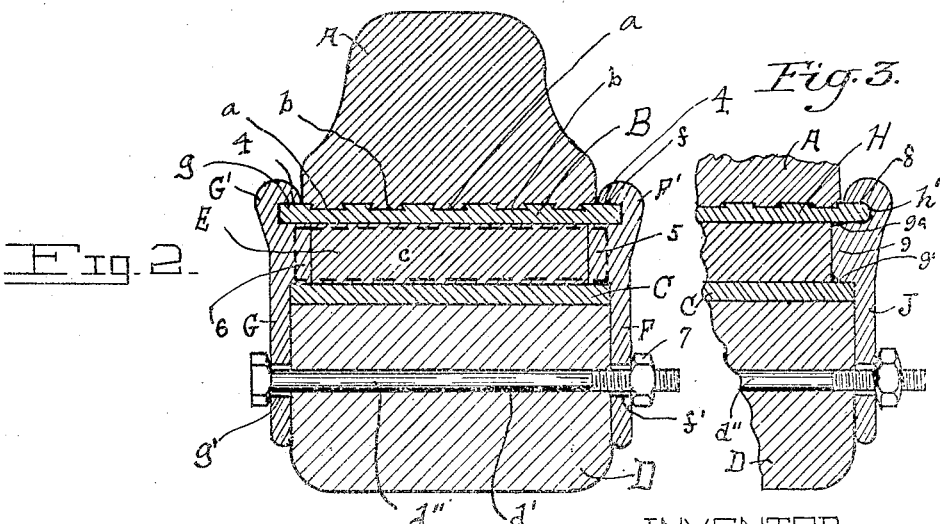
WITNESSES:
INVENTOR,
HIS ATTORNEY.

UNITED STATES PATENT OFFICE.

HERBERT K. WHEELOCK, OF LONG BEACH, CALIFORNIA.

TIRE.

1,336,452.   Specification of Letters Patent.   Patented Apr. 13, 1920.

Application filed February 13, 1917. Serial No. 148,317.

*To all whom it may concern:*

Be it known that I, HERBERT K. WHEELOCK, a citizen of the United States, residing at Long Beach, in the county of Los Angeles and State of California, have invented new and useful Improvements in Tires, of which the following is a specification.

This invention relates to tires, and more particularly to vehicle tires for automobiles, trucks and other vehicles, and it has for its object to provide an improved tire of the general nature stated and means whereby the tire *per se* may readily be detached from and replaced on wheel features.

In accordance with the invention, a detachable rim having a preferably rubber tire secured thereto is provided, in connection with a plurality of side rings and a compressible element adapted to be laterally compressed to radially expand the compressible element, such element being confined between the rim, side rings and the felly, rim or other features of the wheel proper. Bolts with nuts or the like are provided for drawing the rings against the compressible element and such bolts are preferably arranged to pass through the felly of the wheel as well as the rings one of which is disposed at each side thereof. The rings, in addition to confining and compressing the compressible element so that the same by frictional engagement with the tire rim and the periphery of the wheel proper binds the tire to the remaining portions of the wheel, acts to positively hold the rim against lateral or other displacement, a rim-receiving groove being provided in each side ring to that end.

A further object of the invention is to provide a tire and fastening means of the general character stated which will be relatively simple and inexpensive in construction and organization when such advantages as facility in attachment and detachment, freedom from liability to derangement, length of life and general superiority in serviceability are considered.

With the above and other objects in view, the invention consists in the novel and useful provision, formation, combination, association, and inter-relation of parts, members and features, all as hereinafter described, shown in the drawing, and finally pointed out in the claim.

In the drawing:

Figure 1 is a fragmentary side elevation of a vehicle wheel and tire organized in accordance with the invention;

Fig. 2 is a transverse sectional view taken on the line $x^2-x^2$, Fig. 1, and looking in the direction of the appended arrows;

Fig. 3 is a fragmentary view, similar to Fig. 2, of a modified form of construction of the side rings.

The parts in the several figures are designated by the same reference characters.

Referring with particularity to the drawing, in Figs. 1 and 2 thereof, A designates a solid rubber tire, B designates a rim portion to which the tire A is secured, C designates a preferably metallic rim, D designates the felly of a wheel over which the rim C is applied. E designates a compressible element adapted to bind the rim portion B and the rim C together, and F and G designate, respectively, side rings adapted to engage the rim portion B and to compress the compressible element E and cause binding frictional engagement of the same with the rim portion B and the rim C.

The tire A is shown as of conventional form and cross section, and of the type ordinarily employed on motor trucks and the like, the same being secured to its rim portion B in the usual manner as by engagement with such rim portion at the circumference thereof, the rim portion preferably consisting of a relatively thin metallic annulus, externally circumferentially grooved as at $b$, to accommodate key portions $a$ of the tire which project into the grooves $b$. The rim portion B extends laterally at each side of the tire A for engagement with the respective side rings F and G as at $f$ and $g$.

The rim C is preferably a metallic annulus provided on the felly D of the wheel and such annulus is preferably of less width than the annulus constituting the rim portion B. The felly D is suitably joined to a hub, not shown, by spokes or the like, one of which is shown at $d$.

The compressible element E is shown as an annulus $c$ of rubber or the like, adapted to be extended radially under pressure of the side rings and confined by such side rings, the rim portion B, and the rim D. The annulus $c$ is preferably of about the same width as the rim D and of a thickness slightly less than required to fill the space between the rim portion B and the rim D when not under compression by the side rings, but such annulus is thickened and narrowed when under compression by the side rings, so that the rim portion B and the rim D are both firmly engaged thereby.

The side rings F and G may be formed alike, and one disposed at each side of the tire A. Each such ring preferably consists of a metallic member, preferably of considerable width radially, and relatively thin laterally, and adapted to be clamped or otherwise secured to the felly as by bolts $d$ extending through suitable orifices $f'$ or $g'$ provided in the respective member F or G, and accommodated each in a transverse bore $d'$ in the felly D. The rings or members F and G extend outwardly from the felly and are provided with thickened rims as at $F'$ and $G'$, respectively, at the points of contact with the rim portion B. Annular, inwardly facing grooves 4 are provided in the rim portions $F'$ and $G'$ of the rings or members F and G, and such grooves each accommodate one of the extended lateral edges of the rim portion B as at $f'$ and $g'$, when the parts are assembled. Inwardly facing annular compression heads 5 and 6 are provided on the rings F and G, respectively, and in registration with the space provided between the rim portion B and the rim D, so that by drawing the rings inwardly the element E may be put under compression as the heads enter the above mentioned space, in which the element E is disposed.

The rings are assembled with the felly and other parts by passing the bolts through the orifices in the rings and the felly and a nut 7 threaded onto each bolt $d''$ serves to apply the proper pressure to compress the element E and draw the parts together, when such nut is rotated in the proper direction. Upon removal of the nuts, the side ring F may be first removed, after which the tire with its rim portion B may be slipped off the annular compressible element E which has been allowed to assume its normal form by the removal of the compression head 5 with the ring F on which it is formed. After repair or replacement of the tire A on the rim portion B, or other repair, or if a new tire and rim portion are to be employed, such tire and rim portion may be slipped over the annular compressible element E until one edge portion of the rim B is in the groove 4 of the ring G, and the ring F then replaced with the other edge portion of the rim B in its groove 4. By again threading the nuts onto the bolts $d''$ the element may be again properly compressed between the compression heads of the rings F and G. The rings F and G may be tightened against the felly D and its rim C and the tire is in position for service.

In the modified form of the invention shown in Fig. 3 a tire A may be provided with or secured on a rim portion H having rounded extended edges as at $h'$, and a felly such as the felly D being provided with a rim C may have secured thereto at each side a ring J similar to the rings F and G, though modified to conform to the rounded edge portions of the rim portion H, the groove 8 provided in each ring J being complementarily formed to insure proper engagement as between edge portions of the rim portion H and the rings J. The compression heads 9 provided on each of the rings J may be wedge-shaped, wholly or in part, as shown at $9^a$ so that such heads may readily enter the space between the rim portion H and the rim C to compress a compression element such as E between them. When the rings are secured against the felly and rim portion H by means of bolts $d''$ the wedge-shaped heads 9 assist in properly spacing and holding the parts in assemblage.

Having thus disclosed my invention I claim and desire to secure by Letters Patent:

In a device of the character described, the combination with a vehicle wheel, of a tire, a rim permanently applied to the inner periphery of the tire and extending laterally beyond the same, a compressible resilient filler member interposed loosely between the wheel and the tire rim, a pair of similar and interchangeable clamping plates applied to opposite sides of the wheel and grooved in their inner faces to receive and interlock with the edges of the tire rim, and fastening members for securing the clamping rings in position, said clamping rings engaging the resilient filler member to compress the same laterally and expand it radially into a tight frictional engagement with the tire rim.

In testimony whereof, I have signed my name to this specification in the presence of two subscribing witnesses.

HERBERT K. WHEELOCK.

Witnesses:
 RAYMOND IVES BLAKESLEE,
 WILLIS G. MITCHELL.